(12) United States Patent
Kim et al.

(10) Patent No.: US 7,462,663 B2
(45) Date of Patent: *Dec. 9, 2008

(54) PRESSURE-SENSITIVE ADHESIVE COMPOSITION

(75) Inventors: Michael J. Kim, Daejeon (KR); Noma Kim, Daejeon (KR); Sera Kim, Daejeon (KR); Sukky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/583,806

(22) Filed: Oct. 20, 2006

(65) Prior Publication Data

US 2007/0093577 A1 Apr. 26, 2007

(30) Foreign Application Priority Data

Oct. 20, 2005 (KR) .................. 10-2005-0099190
Dec. 21, 2005 (KR) .................. 10-2005-0127183

(51) Int. Cl.
*C08K 5/24* (2006.01)
*C08L 31/00* (2006.01)
*C08L 33/08* (2006.01)

(52) U.S. Cl. ............. 524/262; 524/261; 524/556; 524/558; 524/560

(58) Field of Classification Search ............. 524/556, 524/560, 543, 261, 262, 558; 556/415, 416; 428/447

See application file for complete search history.

(56) References Cited

U.S. PATENT DOCUMENTS 7,262,313 B2 * 8/2007 Kim et al. ............. 556/415
2002/0098352 A1 * 7/2002 Kishioka ............. 428/352

\* cited by examiner

*Primary Examiner*—Vasu Jagannathan
*Assistant Examiner*—Karuna P Reddy
(74) *Attorney, Agent, or Firm*—McKenna Long & Aldridge LLP

(57) ABSTRACT

The present invention relates to a pressure-sensitive adhesive composition, and more precisely, a pressure-sensitive adhesive composition containing an organic silane compound that exhibits excellent initial adhesive strength on a substrate, and does not leave any of the adhesive behind when removed because the adhesive power is not excessively increased even at high temperature or at high temperature and high humidity.

16 Claims, No Drawings

PRESSURE-SENSITIVE ADHESIVE COMPOSITION

This application claims the benefit of the filing date of Korean patent Application Nos. 10-2005-0099190 filed on Oct. 20, 2005 and 10-2005-0127183 filed on Dec. 21, 2005 in the Korean Intellectual Property Office, the disclosure of which is incorporated herein in its entirety by reference.

TECHNICAL FIELD

The present invention relates to a pressure-sensitive adhesive composition, and more precisely, a pressure-sensitive adhesive composition characterized by excellent initial adhesive strength onto a substrate and without leaving any trace of the adhesive behind when removed since the adhesive strength of this composition does not excessively increase at high temperature, or under high humidity and high temperature conditions.

BACKGROUND ART

In general, a liquid crystal cell harboring liquid crystal and a polarizing plate are required to prepare a liquid crystal display device. To attach these components together, a proper adhesive layer is required. To improve the function of a liquid crystal display device, a retardation plate, a wide-viewing angle plate, or a brightness-enhancing film can be additionally laminated onto a polarizing plate.

The general structure of a liquid crystal display device comprises a liquid crystal layer arranged evenly; a multiple structure polarizing plate, wherein a liquid crystal cell comprising a glass plate containing a transparent electrode layer or a plastic board is coated with an adhesive layer; a retardation plate; and a supplementary functional film.

Regarding an adhesive used for the attachment of a polarizing plate, Japanese Laid-Open Patent Publication No. 3022993 describes an acrylic adhesive composition containing a silane compound having an epoxy group, and Japanese Laid-Open Patent Publication No. Hei 7-331204 describes an adhesive composition containing a silane compound having a hydrocarbon group. However, the silane compound containing adhesive cannot provide the satisfactory adhesive strength required for application to a substrate and a polarizing plate in practical use, and has the problems of leaving the adhesive behind after removal and an excessive increase of adhesive strength under high humidity and high temperature conditions.

Japanese Laid-Open Patent Publication No. Hei 8-104855 describes an adhesive composition containing a silane compound with a β-keto ester group and an alkoxy group on its acrylic polymer which exhibits the proper adhesive strength to attach a polarizing plate to the surface of a substrate, and enables removal without leaving the adhesive behind or damaging the substrate.

DISCLOSURE OF THE INVENTION

To overcome the above problems, it is an object of the present invention to provide a composition for improving adhesion between a matrix resin layer and a substrate, and in particular an pressure-sensitive adhesive composition for an LCD polarizing plate having improved adhesive strength to a glass substrate. The composition exhibits excellent initial adhesive strength during attachment to a substrate by containing a novel organic silane compound which is less vulnerable under high humidity and high temperature, and has an advantage that it can be removed without leaving any adhesive behind since its adhesive strength does not excessively increase at high temperature, or under high humidity and high temperature conditions.

It is another object of the present invention to provide a polarizing plate and an LCD device harboring the pressure-sensitive adhesive composition of the present invention having the above characteristics.

To achieve the above objects, the present invention provides a pressure-sensitive adhesive resin composition characteristically containing the organic silane compound represented by the following formula 1.

[Formula 1]

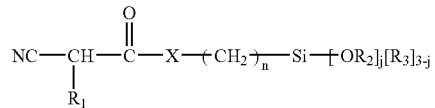

Wherein, $R_1$, $R_2$, and $R_3$ are independently H or $C_1$~$C_3$ alkyl; X is —$NR_4$— ($R_4$ is H or $C_1$~$C_3$ alkyl), an oxygen atom or a sulfur atom; n is an integer from 3~10; and j is an integer from 1~3.

Particularly, the pressure-sensitive adhesive composition of the present invention comprises:

a) 100 weight part of an acrylic copolymer prepared by copolymerization of i) 90~99.9 weight % of a (meth)acrylic acid ester monomer containing $C_1$~$C_{12}$ alkyl and ii) 0.1~10 weight % of a vinyl monomer and/or acrylic monomer harboring a cross-linkable functional group;

b) 0.01~10 weight part of a multi-functional cross-linking agent; and c) 0.01~5 weight part of the organic silane compound represented by formula 1.

The present invention also provides a polarizing plate wherein one side or both sides of the polarizing plate are covered by an adhesive layer(s) containing the pressure-sensitive adhesive composition of the present invention.

The present invention further provides an LCD device containing a liquid crystal panel wherein the above polarizing plate is attached to one side or both sides of the liquid crystal cell.

The present invention is described in detail hereinafter.

As an effort to prepare a high-functional adhesive for the production of LCDs, the present inventors applied the organic silane compound represented by formula 1 to an pressure-sensitive adhesive composition. As a result, the present inventors completed this invention by confirming that the composition of the present invention has excellent initial adhesive strength for glass attachment and enables removal without leaving any adhesive behind because its adhesive strength does not excessively increase at high temperature, or under high humidity and high temperature conditions.

The pressure-sensitive adhesive composition of the present invention characteristically contains the organic silane compound represented by formula 1.

The organic silane compound represented by formula 1 can be prepared by reacting 1-alkenyl cyanoacetate with trialkoxy silane in the presence of chloroplatinic acid catalyst, or by reacting cyanoacetylchloride with N-alkylaminoalkyltrialkoxy in the presence of a tertiary amine.

The above reactions take place in such solvents as a halogenized alkyl solvent including chloroform, methylenechloride and dichloroethane; a cyclic ether solvent including tetrahydrofurane and dioxin; or an aromatic organic solvent including benzene, toluene and xylene.

The preferable reaction temperature is 10~200° C. and 50~150° C. is more preferred. Distillation under reduced pressure can be performed for the purification.

$R_1$ in the organic silane compound represented by formula 1 is preferably a phenyl group.

The silane compound represented by formula 1 of the present invention can include cyanoacetoxypropyl trimethoxysilane represented by the following formula 2 and N-methyl-N-(3-trimethoxysilylpropyl)cyanoacetamide represented by the following formula 3.

[Formula 2]

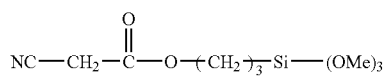

[Formula 3]

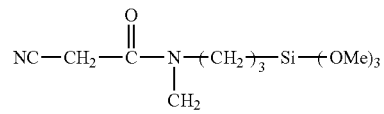

The pressure-sensitive adhesive composition harboring the organic silane compound represented by formula 1 is composed of a) 100 weight part of an acrylic copolymer prepared by copolymerization of i ) 90~99.9 weight % of a (meth) acrylic acid ester monomer containing $C_1$~$C_{12}$ alkyl and ii) 0.1~10 weight % of a vinyl monomer and/or acrylic monomer harboring a cross-linkable functional group; b) 0.01~10 weight part of a multi-functional cross-linking agent; and c) 0.01~5 weight part of the organic silane compound represented by formula 1.

The acrylic copolymer of a) of the present invention can be prepared by copolymerization of i) 90~99.9 weight % of a (meth)acrylic acid ester monomer containing $C_1$~$C_{12}$ alkyl and ii) 0.1~10 weight % of a vinyl monomer and/or acrylic monomer harboring a cross-linkable functional group.

The (meth)acrylic acid ester monomer containing $C_1$~$C_{12}$ alkyl of a) i ) can be $C_1$~$C_{12}$ alkyl ester, but $C_2$~$C_8$ alkyl ester is more preferred. If the alkyl group of the alkyl(meth)acrylate is in the form of a long-chain, the cohesive force of the adhesive is reduced. Therefore, to maintain adhesive force at high temperature, the acceptable carbon number is determined to be 1~12 and more preferably 2~8.

Particularly, the (meth)acrylic acid ester monomer containing $C_1$~$C_{12}$ alkyl can be one or more compounds selected from a group consisting of butyl(meth)acrylate, 2-ethylhexyl (meth)acrylate, ethyl(meth)acrylate, methyl(meth)acrylate, n-propyl(meth)acrylate, isopropyl(meth)acrylate, t-butyl (meth)acrylate, pentyl(meth)acrylate, n-octyl(meth)acrylate, isooctyl(meth)acrylate and isononyl(meth)acrylate.

To regulate the glass transition temperature of an adhesive or to endow other functions, a monomer acceptable for copolymerization can be additionally added to the acrylic copolymer, precisely, acrylonitrile, styrene, glycidyl(meth)acrylate or vinylacetate can be added.

The vinyl monomer and/or acrylic monomer containing a cross-linkable functional group of a) ii) is reacted with a cross-linking agent to prevent the destruction of the cohesive force of the adhesive at high temperature or under high humidity, or rather to improve the cohesive force or adhesion strength by way of a chemical bond.

The vinyl monomer and/or acrylic monomer having a cross-linkable functional group can be one or more monomers selected from a group consisting of a hydroxyl group containing monomers such as 2-hydroxyethyl(meth)acrylate, 2hydroxypropyl(meth)acrylate, 4-hydroxybutyl(meth)acrylate, 2-hydroxyethyleneglycol(meth)acrylate and 2-hydroxypropyleneglycol(meth)acrylate; and a carboxyl group containing monomers such as acrylic acid, (meth)acrylic acid, acrylic acid dimer, itaconic acid, maleic acid and maleic anhydride.

The preferable content of the vinyl monomer and/or acrylic monomer having a cross-linkable functional group in the acrylic copolymer is 0.1~10 weight %. If the content is less than 0.1 weight %, cohesive force might be destroyed at high temperature or under high humidity, and adhesive strength cannot be improved. On the contrary, if the content is more than 10 weight %, the cohesive force will increase, resulting in a decrease of the stress relaxation property.

It is preferred to eliminate volatile components and reaction residues so as not to generate bubbles. Low cross-linking density or molecular weight results in low elasticity of an adhesive. In that case, bubbles generated in between a glass substrate and an adhesive layer grows at high temperature to form a scatterer inside the adhesive layer. Repeated application of an adhesive having high elastic modulus might induce an excessive cross-linking reaction, resulting in separation in the tail of an adhesive sheet.

Viscoelasticity of an adhesive is determined by the molecular weight, the molecular weight distribution, or the molecular structure of a polymer chain, and in particular by the molecular weight. Based on that, the weight average molecular weight of the acrylic copolymer is 800,000~2,000,000, which can be prepared by the conventional radical copolymerization.

The acrylic copolymer comprising the above mentioned components can be prepared by solution polymerization, photopolymerization, bulk polymerization, suspension polymerization or emulsion polymerization, and among these conventional methods, solution polymerization is preferred. The preferable polymerization temperature is 50~140° C. and an initiator is added after the monomers are evenly mixed.

The multifunctional cross-linking agent of b) of the present invention is reacted with a carboxyl group or a hydroxyl group to improve the cohesive force of the adhesive.

The multifunctional cross-linking agent can be isocyanate compounds, epoxy compounds, aziridine compounds or metal chelate compounds, and among these compounds, an isocyanate cross-linking agent is preferred.

Particularly, the isocyanate compound can be selected from a group consisting of tolylenediisocyanate, xylenediisocyanate, diphenylmethnediisocyanate, hexamethylenediisocyanate, isoformdiisocyanate, tetramethylxylenediisocyanate, naphthalenediisocyanate and their reactants with polyol such as trimethylolpropane.

The epoxy compound can be selected from a group consisting of ethyleneglycoldiglycidylether, triglycidylether, trimethylolpropanetriglycidylether, N,N,N',N'-tetraglycidylethylenediamine and glycerindiglycidylether.

The aziridine compound can be selected from a group consisting of N,N'-toluene-2,4-bis(1-aziridinecarboxide), N,N'-diphenylmethne-4,4'-bis(1-aziridinecarboxide), triethylenemelanin, bisisoprothaloyl-1-(2-methylaziridine) and tri-1-aziridinylphosphineoxide.

The metal chelate compound can be selected from a group consisting of those compounds where a polyvalent metal such as aluminum, iron, zinc, tin, titan, antimony, magnesium and vanadium is coordinated in acetylacetone or acetoacetateethyl.

It is preferred that, to obtain an even coating, the multifunctional cross-linking agent does not induce a cross-linking reaction during the mixing process. After coating, drying and aging, a cross-linking structure is formed to give elasticity and an adhesive layer having a strong cohesive force. At this time, the strong cohesive force of an adhesive can improve the adhesive properties including durability and cutting-efficiency.

The preferable content of the multifunctional cross-linking agent in 100 weight part of the acrylic copolymer is 0.01~10 weight part. If the content is less than 0.01 weight part, cohesive force will be decreased, as will durability. Within the above content range, an adhesive exhibits excellent cohesive force but no problems in durability including separation or detachment.

The organic silane compound represented by formula 1 of c) included in a pressure-sensitive adhesive composition functions to provide excellent early adhesive strength on a glass board and no adhesive is left behind after removal because it prevents an excessive increase of adhesive strength at high temperature or under high humidity and high temperature conditions.

The preferable content of the organic silane compound represented by formula 1 in 100 weight part of the acrylic copolymer is 0.01~5 weight part. If the content is less than 0.01 weight part, the adhesive strength on the glass will not be satisfactory at high temperature or with high humidity. On the other hand, if the content is more than 5 weight part, which means the compound is used in excess, durability will be reduced and will cause bubbles or separation.

The organic silane compound of formula 1 can be added during mixing after the polymerization of the acrylic copolymer, or during the polymerization of the acrylic copolymer.

The pressure-sensitive adhesive composition of the present invention comprising the above components can additionally include a tackifier resin to regulate adhesion capacity.

The tackifier resin can be one or more compounds selected from a group consisting of (hydrogenated)hydrocarbon resin, (hydrogenated)rosin resin, (hydrogenated)rosinester resin, (hydrogenated)terpene resin, (hydrogenated)terpenephenol resin, polymerized rosin resin and polymerized rosinester resin.

The preferable content of the tackifier resin in 100 weight part of the acrylic copolymer is 1~100 weight part. If the content is more than 100 weight part, the compatibility or cohesive force of the adhesive will be reduced.

The pressure-sensitive adhesive composition of the present invention can additionally include any additive selected from a group consisting of an acrylic plasticizer, a low-molecular substance, epoxy resin, a hardener, a UV stabilizer, an antioxidant, a toning agent, a reinforcing agent, a filler, an antifoaming agent and a surfactant.

The acrylic pressure-sensitive adhesive composition of the present invention comprising the above compounds can be prepared by the conventional methods, for example thermosetting or photosetting.

The preferable cross-linking density of the acrylic pressure-sensitive adhesive composition of the present invention is 5~95%, for the optimum balance of physical properties. The cross-linking density indicates the weight % of the cross-linked part of the acrylic adhesive which is insoluble in a solvent and measured by the gel content measuring method. If the cross-linking density is less than 5%, the cohesive force of the pressure-sensitive adhesive composition and adhesion durability will be reduced, together with the generation of bubbles or separation. If the cross-linking density is more than 95%, durability will be reduced along with detachment.

The present invention further provides a polarizing plate containing the pressure-sensitive adhesive composition of the present invention as an adhesive layer. Particularly, one side or both sides of a polarizing film of the polarizing plate are coated with the adhesive layer containing the pressure-sensitive adhesive composition of the present invention.

The polarizing film or device for the polarizing plate is not limited to a specific one. The polarizing film can be any film prepared by applying such polarizing components as iodine or dichromatic dye onto a polyvinyl alcohol resin and stretching the prepared mixture. The thickness of a polarizing film is not limited either. Herein, the polyvinyl alcohol resin can be one of polyvinyl alcohol, polyvinyl formal, polyvinylacetal, ethylene and vinylacetate copolymer hydrolysate.

Both sides of a polarizing film can be coated by multistructured films covered with several protective films including a cellulose film such as triacetyl cellulose, a polycarbonate film, a polyester film such as terephthalate, a polyethersulfone film, a polyolefin film harboring polyethylene, polypropylene, cyclic or norbornene structure and a polyolefin film such as ethylene propylene copolymer. The thickness of the protective film is not limited and any general thickness is acceptable.

The method of forming an adhesive layer on a polarizing film is not limited, either. For example, an adhesive can be applied and dried on a polarizing film surface by using a bar coater, or an pressure-sensitive adhesive can be applied and dried on a removable substrate surface and then the formed adhesive layer on the removable substrate surface is transfered and aged on the surface of a polarizing film.

The polarizing plate of the present invention can contain one or more additional layers such as a protective layer, a reflecting layer, an anti-glare layer, a retardation plate, a wide-viewing angle film, or a brightness enhancing film to provide additional functions.

The polarizing plate containing the pressure-sensitive adhesive composition of the present invention can be widely applied to every general LCD and the applicable liquid crystal panel is not limited. But, it is preferred that the polarizing plate coated with the pressure-sensitive adhesive composition of the present invention is applied onto one or both sides of the liquid crystal cell of the liquid crystal panel to produce an LCD.

The pressure-sensitive adhesive composition of the present invention can be widely applied for the production of industrial sheets particularly reflective sheets, structural adhesive sheets, photographic adhesive sheets, adhesive sheets for traffic lanes, optical adhesive products, adhesives for electronic devices, etc. The pressure-sensitive adhesive composition of the present invention can be further applied to other industrial fields such as multiple structured laminate products, for example commercial adhesive sheet products, medical patches, heat activated pressure sensitive adhesives, etc.

Best Mode for Carrying Out the Invention

Practical and presently preferred embodiments of the present invention are illustrated as shown in the following examples.

However, it will be appreciated that those skilled in the art, on consideration of this disclosure, may make modifications and improvements within the spirit and scope of the present invention.

EXAMPLES

Example 1

(Preparation of Acrylic Copolymer)

To a 1 L reactor equipped with a cooling device for the regulation of temperature and the reflux of nitrogen gas was added a monomer mixture composed of 98.1 weight part of n-butylacrylate (BA), 1.4 weight part of acrylic acid (AA) and 0.5 weight part of 2-hydroxyethylmethcrylate (2-HEMA), to which 100 weight part of ethylacetate (EAc) was added as a solvent and the reaction mixture was heated to 62° C. After mixing the mixture evenly, 0.07 weight part of azobisisobutylonitrile (AIBN) was added as a reaction initiator, followed by reaction for 8 hours to give an acrylic copolymer having a weight average molecular weight of 1,200,000.

(Preparation of Organic Silane Compound)

To a 1 L reactor equipped with a thermometer and a condenser were added 200 mL of THF, 40 g (0.319 mol) of alkylcyanoacetate and 40 g (0.327 mol) of trimethoxysilane. The temperature of the reactor was raised to 60° C. 0.05 g of chloroplatinic acid was added thereto, followed by reaction for 4 hours. Upon completion of the reaction, the solvent and non-reactants were eliminated, followed by distillation under reduced pressure to give 73 g of cyanoacetoxypropyl trimethoxysilane (formula 2). The yield was 91%.

(Mixing)

To 100 weight part of the acrylic copolymer were added 0.5 weight part of tolylenediisocyanate additive (TMP-TDI) of trimethylolpropane as a cross-linking agent and 1.0 weight part of the cyanoacetoxypropyl trimethoxysilane (Formula 2) prepared above. To achieve a satisfactory level of coating, the mixture was diluted and evenly mixed. A release paper was coated with the mixture, followed by drying to give an adhesive layer 25 μm thick.

(Lamination)

The prepared adhesive layer was laid on an iodine polarizing plate 185 μm thick, followed by adhesive processing. The laminated board was stored for 4 days at 23° C. with 55% humidity for full aging.

The prepared polarizing plate was cut for evaluation.

Example 2

(Preparation of Acrylic Copolymer)

The acrylic copolymer was prepared in the same manner as described in Example 1.

(Preparation of Organic Silane Compound)

To a 1 L reactor equipped with a thermometer, a condenser and a loading glass were added 200 mL of diethylether and 11 g of cyanoacetylchloride, followed by stirring at room temperature in the presence of nitrogen. To the reactor were slowly added 20 g of N-methylaminopropyl trimethoxysilane (0.104 mol) and 11 g of pyridine (0.14 mol) in 100 mL of diethylether by using the loading glass. The reaction mixture was stirred for 2 hours at room temperature and then the precipitated pyridine salt was eliminated. After removing the solvent and non-reactants, the reaction mixture was distilled under reduced pressure to give 21 g of N-methyl-N-(3-trimethoxysilylpropyl)cyanoacetamide (formula 3). The yield was 75%.

(Mixing)

An experiment was performed in the same manner as described in Example 1 except that N-methyl-N-(3-trimethoxysilylpropyl)cyanoacetamide (formula 3) was used instead of cyanoacetoxypropyl trimethoxysilane.

Example 3

An experiment was performed in the same manner as described in Example 1 except that 0.5 weight part of cyanoacetoxypropyl trimethoxysilane (formula 2) prepared in Example 1, and 0.5 weight part of N-methyl-N-(3-trimethoxysilylpropyl)cyanoacetamide (formula 3) prepared in example 2, were added as a silane compound.

Comparative Example 1

An experiment was performed in the same manner as described in Example 1 except that 3-glycidoxypropyltrimethoxysilane was used as a silane compound instead of cyanoacetoxypropyl trimethoxysilane during the mixing process of Example 1.

Comparative Example 2

An experiment was performed in the same manner as described in Example 1 except that cyanoacetoxypropyl trimethoxysilane was not used as a silane compound during the mixing process of Example 1.

The polarizing plates prepared in Examples 1~3 and Comparative Examples 1~2 were tested for adhesion to glass, adhesive strength at high temperature or at high temperature and high humidity, and removability. The results are shown in Table 1.

a) Durability—The polarizing plates (90 mm×170 mm) prepared in Examples 1~3 and Comparative Examples 1~2 were attached on both sides of a glass substrate (110 mm×190×mm×0.7 mm) as the optical absorption axis was crossed. The pressure was kg/cm² and the process was performed in a clean room so as not to generate bubbles or impurities. The samples were left for 1,000 hours at 60° C. and 90% relative humidity, during which bubbles or removal was observed. Durability was measured based on the below evaluation standard.

| | Evaluation Standard |
|---|---|
| ○ | No bubbles or removal was observed. |
| x | Bubbles or removal was observed. | b) Adhesion to glass—The polarizing plates prepared in Examples 1~3 and Comparative Examples 1~2 were aged for 7 days at room temperature (23° C., 60% R.H). Then each polarizing plate was cut into 1 inch×6 inch sections, which were laid on a nonalkaline glass substrate 0.7 mm thick by using a 2 kg rubber roller, and were then stored at room temperature. One hour later, the initial adhesive strength was measured. To investigate the increase of adhesive strength at high temperature or under high humidity and high temperature conditions, the samples stood for 10 hours at 80° C. or for 12 hours at 60° C. and 90% R.H, followed by measurement of the adhesive strength. The adhesive strength was determined by measuring removal strength at an angle of 180° and a speed of 300 mm/min by using a tension tester.

c) Removability—The polarizing plates (90 mm×170 mm) prepared in Examples 1~3 and Comparative Examples 1~2 were attached onto a glass substrate (110 mm×190×mm×0.7 mm), followed by aging for 10 hours at 80° C. or for 12 hours at 60° C. and 90% R.H. The samples stood at room temperature for one hour and then the polarizing plates were separated from the glass substrate and removability was measured based on the following evaluation standard.

| | Evaluation Standard |
|---|---|
| o | An adhesive was not left after removal. |
| x | An adhesive was left after removal. |

TABLE 1

| | | Adhesion to glass (g/25 mm) | | | Removability | |
|---|---|---|---|---|---|---|
| | Dura-bility | Initial adhesive strength | 80° C., 10 hrs | 60° C., 90% R.H, 12 hrs | 80° C., 10 hrs | 60° C., 90% R.H, 12 hrs |
| Example 1 | o | 650 | 840 | 780 | o | o |
| Example 2 | o | 680 | 820 | 790 | o | o |
| Example 3 | o | 660 | 810 | 750 | o | o |
| Comparative Example 1 | o | 300 | 1200 | 1130 | x | x |
| Comparative Example 2 | x | 250 | 1000 | 150 | o | o |

As shown in Table 1, the pressure-sensitive adhesive compositions prepared in Examples 1~3 containing a novel organic silane compound represented by formula 1 exhibit excellent adhesive strength during the initial attachment to glass and at the same time have the advantage of not leaving any adhesive after removal because of the controlled increase of adhesive strength at high temperature or at high temperature and high humidity.

INDUSTRIAL APPLICABILITY

The pressure-sensitive adhesive composition of the present invention can be used to improve the adhesive strength between a matrix resin and a substrate. Particularly, the composition included in an adhesive for an LCD polarizing plate contributes to improving adhesive strength onto a glass substrate, provides excellent initial adhesive strength onto a substrate by containing a novel organic silane compound which is less vulnerable at high temperature and high humidity, secures clean removal without leaving any adhesive behind since it prevents an excessive increase of adhesive strength due to high temperature and high humidity.

Those skilled in the art will appreciate that the conceptions and specific embodiments disclosed in the foregoing description may be readily utilized as a basis for modifying or designing other embodiments for carrying out the same purposes as the present invention. Those skilled in the art will also appreciate that such equivalent embodiments do not depart from the spirit and scope of the present invention as set forth in the appended claims.

The invention claimed is:

1. A pressure-sensitive adhesive resin composition, which characteristically contains an organic silane compound represented by the following formula 1:

[Formula 1]

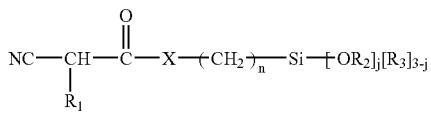

Wherein, each of $R_1$, $R_2$, and $R_3$ are independently H or $C_1$-$C_3$ alkyl; X is —$NR_4$— ($R_4$ is H or $C_1$-$C_3$ alkyl), an oxygen atom or a sulfur atom; n is an integer from 3-10; and j is an integer from 1-3.

2. The adhesive resin composition according to claim 1, wherein the composition comprises:
   a) 100 weight part of an acrylic copolymer prepared by copolymerization of i) 90-99.9 weight % of a (meth)acrylic acid ester monomer containing $C_1$-$C_{12}$ alkyl and ii) 0.1-10 weight % of a vinyl monomer and/or acrylic monomer harboring a cross-linkable functional group;
   b) 0.01-10 weight part of a multi-functional cross-linking agent; and
   c) 0.01-5 weight part of the organic silane compound represented by formula 1.

3. The pressure-sensitive adhesive resin composition according to claim 1, wherein the organic silane compound is prepared by reacting 1-alkenyl cyanoacetate with trialkoxy silane in the presence of chloroplatinic acid catalyst, or by reacting cyanoacetylchloride with N-alkylaminoalkyltrialkoxide in the presence of a tertiary amine.

4. The pressure-sensitive adhesive resin composition according to claim 2, wherein the organic silane compound is prepared by reacting 1-alkenyl cyanoacetate with trialkoxy silane in the presence of chloroplatinic acid catalyst, or by reacting cyanoacetylchloride with N-alkylaminoalkyltrialkoxide in the presence of a tertiary amine.

5. The pressure-sensitive adhesive resin composition according to claim 1, wherein the organic silane compound is cyanoacetoxypropyl trimethoxysilane represented by the following formula 2 or N-methyl-N-(3-trimethoxysilylpropyl) cyanoacetamide represented by the following formula 3

[Formula 2]
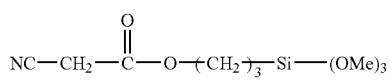

[Formula 3]
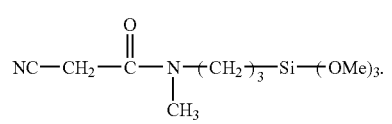

6. The pressure-sensitive adhesive resin composition according to claim 2, wherein the organic silane compound is cyanoacetoxypropyl trimethoxysilanerepresented by the following formula 2 or N-methyl-N-(3-trimethoxysilylpropyl) cyanoacetamide represented by the following formula 3

[Formula 2]
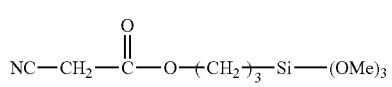

[Formula 3]
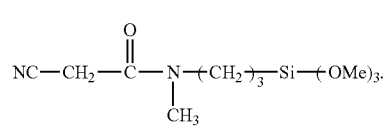

7. The pressure-sensitive adhesive composition according to claim 2, wherein the (meth)acrylic acid ester monomer containing $C_1$~$C_{12}$ alkyl is one or more compounds selected from a group consisting of butyl(meth)acrylate, 2-ethylhexyl (meth)acrylate, ethyl(meth)acrylate, methyl(meth)acrylate, n-propyl(meth)acrylate, isopropyl(meth)acrylate, t-butyl (meth)acrylate, pentyl(meth)acrylate, n-octyl(meth)acrylate, isooctyl(meth)acrylate and isononyl(meth)acrylate.

8. The pressure-sensitive adhesive composition according to claim 2, wherein the vinyl monomer and/or acrylic monomer having a cross-linkable functional group of a)ii) is one or more compounds selected from a group consisting of 2-hydroxyethyl(meth)acrylate, 2-hydroxypropyl(meth)acrylate, 4-hydroxybutyl(meth)acrylate, 2-hydroxyethyleneglycol (meth)acrylate, 2-hydroxypropyleneglycol(meth)acrylate, acrylic acid, (meth)acrylic acid, acrylic acid dimer, itaconic acid, maleic acid and maleic anhydride.

9. The pressure-sensitive adhesive composition according to claim 2, wherein the multifunctional cross-linking agent of (b) is one or more compounds selected from a group consisting of isocyanate compounds, epoxy compounds, aziridine compounds and metal chelate compounds.

10. The pressure-sensitive adhesive composition according to claim 2, wherein the composition additionally includes 1-100 weight part of one or more tackifier resins selected from a group consisting of (hydrogenated)hydrocarbon resin, (hydrogenated)rosin resin, (hydrogenated)rosinester resin, (hydrogenated)terpene resin, (hydrogenated)terpenephenol resin, polymerized rosin resin and polymerized rosinester resin, based on 100 weight part of the acrylic copolymer.

11. The pressure-sensitive adhesive composition according to claim 2, wherein the composition additionally includes one or more additives selected from a group consisting of an acrylic plasticizer, a low-molecular substance, epoxy resin, a hardener, a UV stabilizer, an antioxidant, a toning agent, a reinforcing agent, a filler, an antifoaming agent and a surfactant.

12. The pressure-sensitive adhesive composition according to claim 1, wherein the cross-linking density of the composition is 5-95%.

13. The pressure-sensitive adhesive composition according to claim 2, wherein the cross-linking density of the composition is 5-95%.

14. A polarizing plate in which one side or both sides are coated with an adhesive layer containing the pressure-sensitive adhesive composition of claim 1.

15. The polarizing plate according to claim 14, wherein the polarizing plate additionally includes one or more layers selected from a group consisting of a protective layer, a reflecting layer, an anti-glare layer, a retardation plate, a wide-viewing angle film and a brightness enhancing film.

16. A liquid crystal display (LCD) device containing a liquid crystal panel wherein one side or both sides of the liquid crystal cell are covered with the polarizing plate of claim 14.

* * * * *